(12) United States Patent
Mothaffar

(10) Patent No.: US 8,127,636 B2
(45) Date of Patent: Mar. 6, 2012

(54) VARIABLE TRANSMISSION FOR A MOTOR VEHICLE

(76) Inventor: Hussain Y. Mothaffar, Al-Salmiya (KW)

( * ) Notice: Subject to any disclaimer, the term of this patent is extended or adjusted under 35 U.S.C. 154(b) by 703 days.

(21) Appl. No.: 12/265,320

(22) Filed: Nov. 5, 2008

(65) Prior Publication Data

US 2009/0056486 A1     Mar. 5, 2009

Related U.S. Application Data

(63) Continuation-in-part of application No. 11/428,978, filed on Jul. 6, 2006, now Pat. No. 7,461,570.

(51) Int. Cl.
*F16H 3/50*     (2006.01)
(52) U.S. Cl. ............................ 74/349; 74/348
(58) Field of Classification Search .................... 74/348, 74/349
See application file for complete search history.

(56) References Cited

U.S. PATENT DOCUMENTS

| | | | | | |
|---|---|---|---|---|---|
| 1,635,296 | A | * | 7/1927 | Von Doemming | 74/348 |
| 2,025,763 | A | * | 12/1935 | Martin | 74/337 |
| 3,380,332 | A | * | 4/1968 | Panicci et al. | 84/484 |

FOREIGN PATENT DOCUMENTS

EP        41925 A2 * 12/1981

* cited by examiner

*Primary Examiner* — Ha D. Ho
(74) *Attorney, Agent, or Firm* — Lowe Hauptman Ham & Berner, LLP

(57) ABSTRACT

A variable speed transmission including a housing, a frusto-conical gear having a hollow extending longitudinally through the gear and a plurality of spaced teeth on an inner and/or outer surface thereof. The plurality of spaced apart teeth include alternately teeth having a first addendum and teeth having a second or larger addendum. The transmission also includes a power shaft and a plurality of sliding face gears adapted to engage an input gear from an engine and a drive gear for engaging the frusto-conical gear.

9 Claims, 12 Drawing Sheets

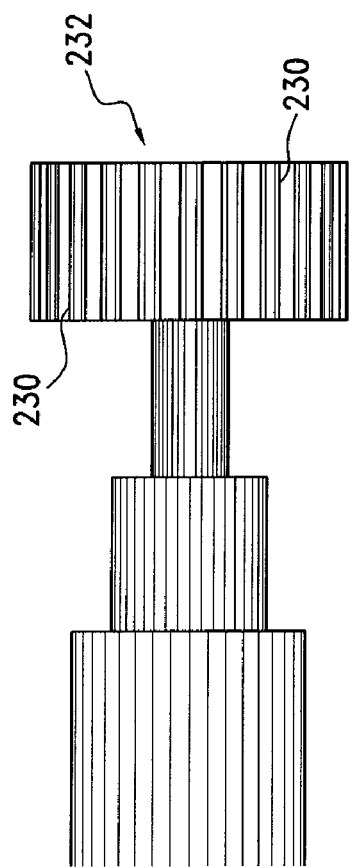
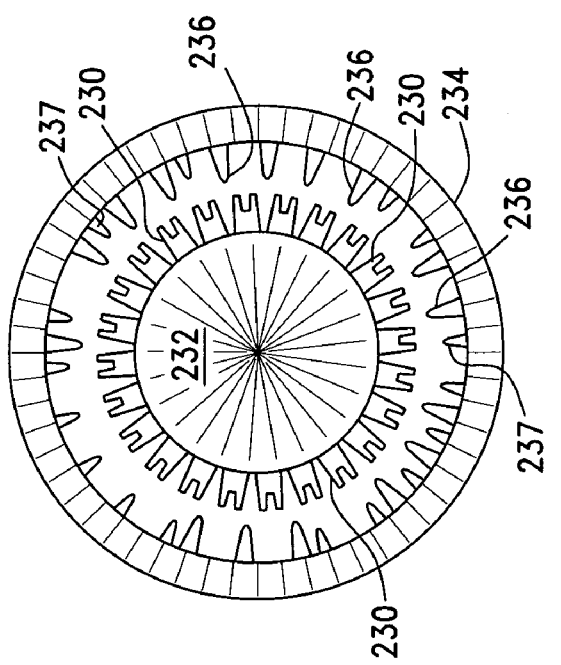
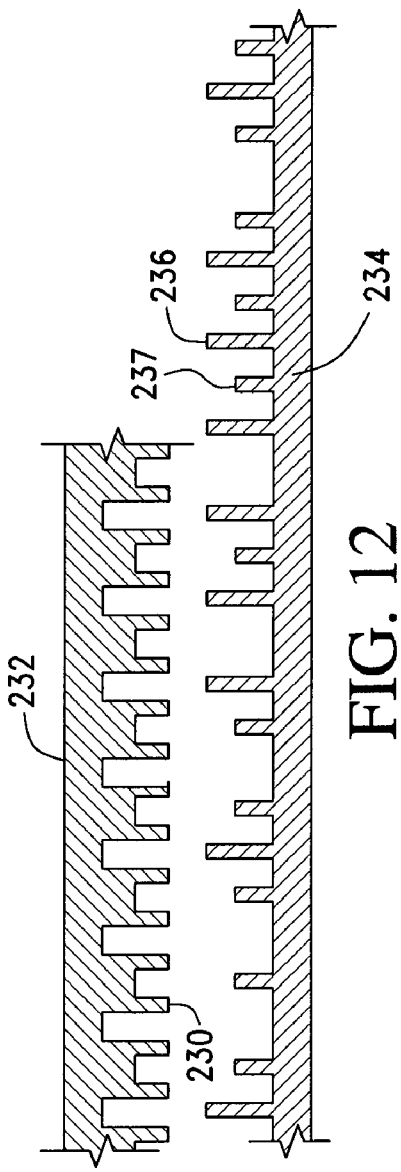
FIG. 11
FIG. 12
FIG. 10

VARIABLE TRANSMISSION FOR A MOTOR VEHICLE

CROSS-REFERENCE TO RELATED APPLICATIONS

The present application is a Continuation-In-Part of U.S. application Ser. No. 11/428,978, filed on Jul. 6, 2006, and priority is hereby claimed under 35 USC §120 based on these applications. Each of these applications is hereby incorporated by reference in their entirety into the present application.

FIELD OF THE INVENTION

The present invention relates a variable speed transmission having at least one hollow frusto-conical gear with a plurality of step-down and step-up sliding gear combinations and more particularly to a variable speed transmission having at least one hollow frusto-conical gear with a plurality of step-down, step-up sliding gear combinations and wherein the frusto-conical gears have different addendums and wherein the teeth in a driving gear define complimentary openings of first and second depths.

BACKGROUND OF THE INVENTION

Many prior art vehicle automatic variable transmissions have been developed in recent years for various purposes. Most of these variable transmissions using conical-shaped gears have been using frictional non-slip contact between a plurality of gears on their surfaces.

One of the disadvantages associated with these prior art variable transmission using frictional non-slip contact between the gears is the inefficient operation and loss power as a result of the frictional contact.

It is therefore a primary object of the present invention to provide a variable transmission using at least one frusto-conical gear and a plurality of sliding face gears in combination with the frusto-conical gear to provide an infinite number of step-up and step-down gear configurations in combination with a conventional vehicle automatic transmission.

In my earlier application, I disclosed a variable speed transmission that includes at least one frusto-conical gear having a hollow space therewithin for housing a plurality of sliding face gears supported on a main power shaft. In this transmission the plurality of sliding face gears are hydraulically slidable to engage one another in a various step-up or step-down configurations to provide a smoother automatic shifting and driving condition.

BRIEF SUMMARY OF THE INVENTION

In essence the present invention contemplates a motor vehicle transmission comprising a housing and a frusto-conical driven gear having a plurality of spaced apart teeth on one surface thereof and a hollow opening therein extending through the length thereof and rotatably disposed within the housing. The transmission also includes a first main power shaft having a plurality of sliding face gears slidably supported thereon wherein a first of said plurality of sliding face gears is adapted to engage an input gear from an engine and a second of said plurality of sliding face gears is a driven gear with a plurality of complimentary spaced apart teeth for engaging the plurality of spaced apart teeth of the frusto-conical gear. The present invention is also characterized by a plurality of complimentary teeth on the frusto-conical gear including a first number of teeth having a first addendum and plurality of complimentary teeth having a larger addendum. In addition, the teeth in the driving gear form a plurality of relatively shallow teeth receiving openings for receiving and engaging the complimentary teeth having a first addendum and a plurality of relatively deep openings for receiving and engaging the complimentary teeth having a larger opening and for separating the shallow teeth receiving openings.

The invention will now be described in connection with the accompanying drawings.

DESCRIPTION OF THE DRAWINGS

FIG. 10 is a schematic illustration showing the inwardly projecting teeth on the outer periphery of the frusto-conical gear and the outwardly projecting teeth on the drive gear;

FIG. 11 is a schematic illustration of a drive gear with a hydraulically controlled moveable arm that moves the gear to slide or shift through different diameters of the frusto-conical gears on the inside or outside thereof by forward or backward movement;

FIG. 12 is a schematic illustration of the gear teeth and complimentary teeth as used in the present invention, but without showing the curvature between the base circle and the addendum circle;

DESCRIPTION OF THE PREFERRED EMBODIMENTS OF THE INVENTION

Figure 1:
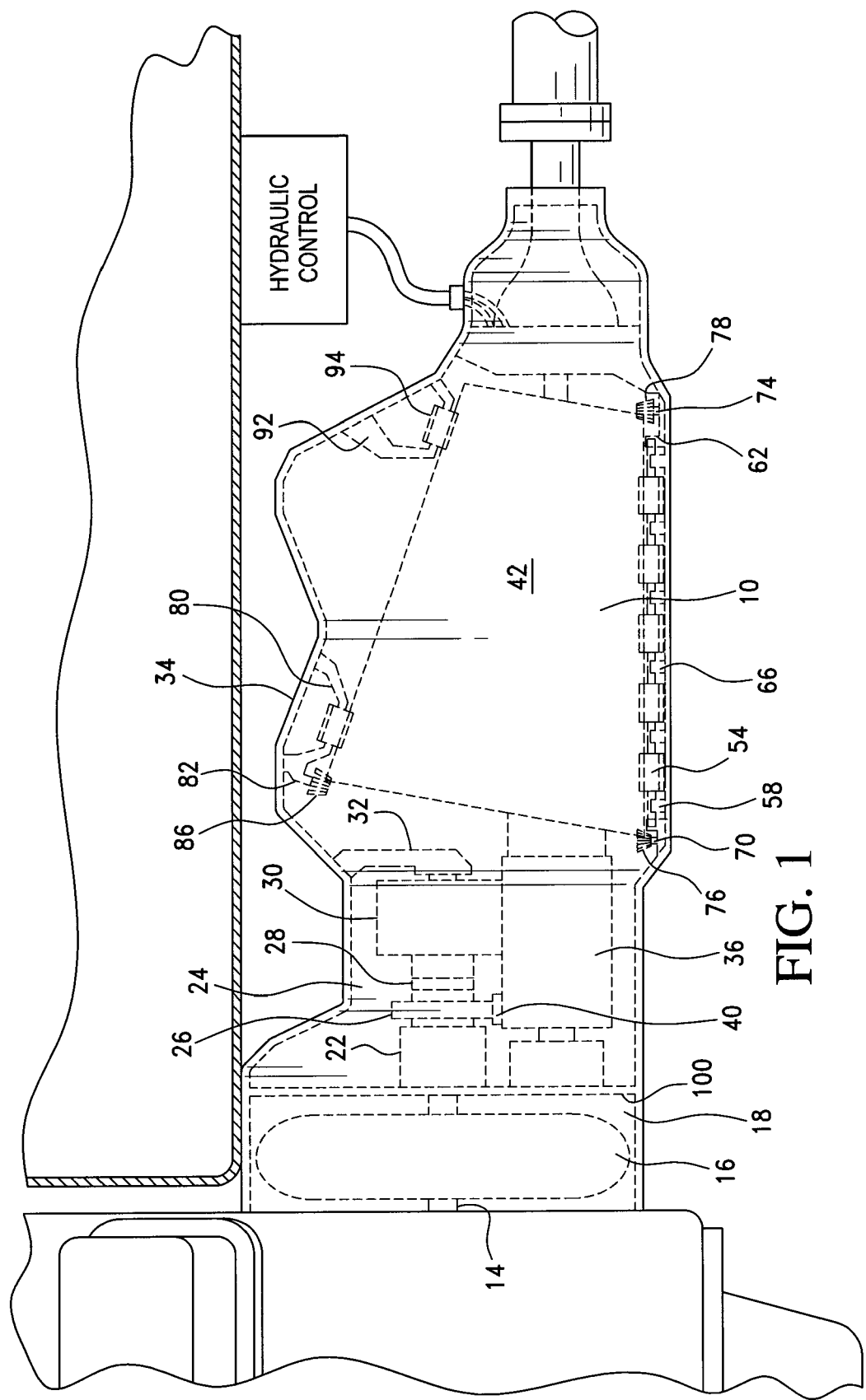
FIG. 1 is a perspective view of the first preferred embodiment of the variable transmission having a single frusto-conical gear within a vehicle according to the present invention.

For the purpose of promoting and understanding of the principles of the invention, reference will now be made to the embodiments illustrated in the drawings. Referring now to the drawings, and more specifically FIG. 1, wherein the showings are for the purpose of illustrating the preferred embodiment of the invention only and not for the purpose of limiting the same, a variable speed transmission 10 is illustrated within, for example, a vehicle, comprising an engine 12 having an engine output rotating shaft 14 operably connected to a conventional power converter 16 disposed within a power converter housing 18. An output power shaft, which is an input power shaft 20 providing power to the transmission engages a conventional clutch mechanism 22, for example, but not limited to, a centrifugal clutch.

A conventional automatic transmission 24 includes a plurality of conventional face gears and clutch disks representing a reverse face gear 26, a neutral gear 28, and a drive gear 30, all of which are axially disposed on the input power shaft 20, one end of which is supported on a support arm 32 extending from inner wall of an housing 34 of the variable speed transmission 10.

A first main face gear 36 having a substantially cylindrical shape and configuration and a plurality of teeth 38 on an outer surface thereof engages a rotation gear changer 40, which in turn engages the reverse gear 26, as well as the drive gear 30 depending on the driver's choice of placing the standard transmission in reverse R or drive D mode.

A first frusto-conical gear is illustrated at 42 and rotatably disposed within the housing 34 in a manner which is described in greater detail. The first frusto-conical gear 42 is of a face type having a first end 44 and a second end 46, wherein the first end 44 has a larger diameter than that of the second end 46, and a hollow opening 48 extending the length of the first frusto-conical gear 42 between the first end 44 and the second end 46. The first frusto-conical gear 42 includes a plurality of helical teeth 50 on an outer surface thereof. Moreover, the first frusto-conical gear 42 includes a second plurality of teeth 52 on inner surface thereof within the hollow opening 48 and proximate the second end 46, which, as will be explained in greater detail herein, engage a driving gear to provide input rotational force for rotating the first frusto-conical gear 42.

Figure 2:
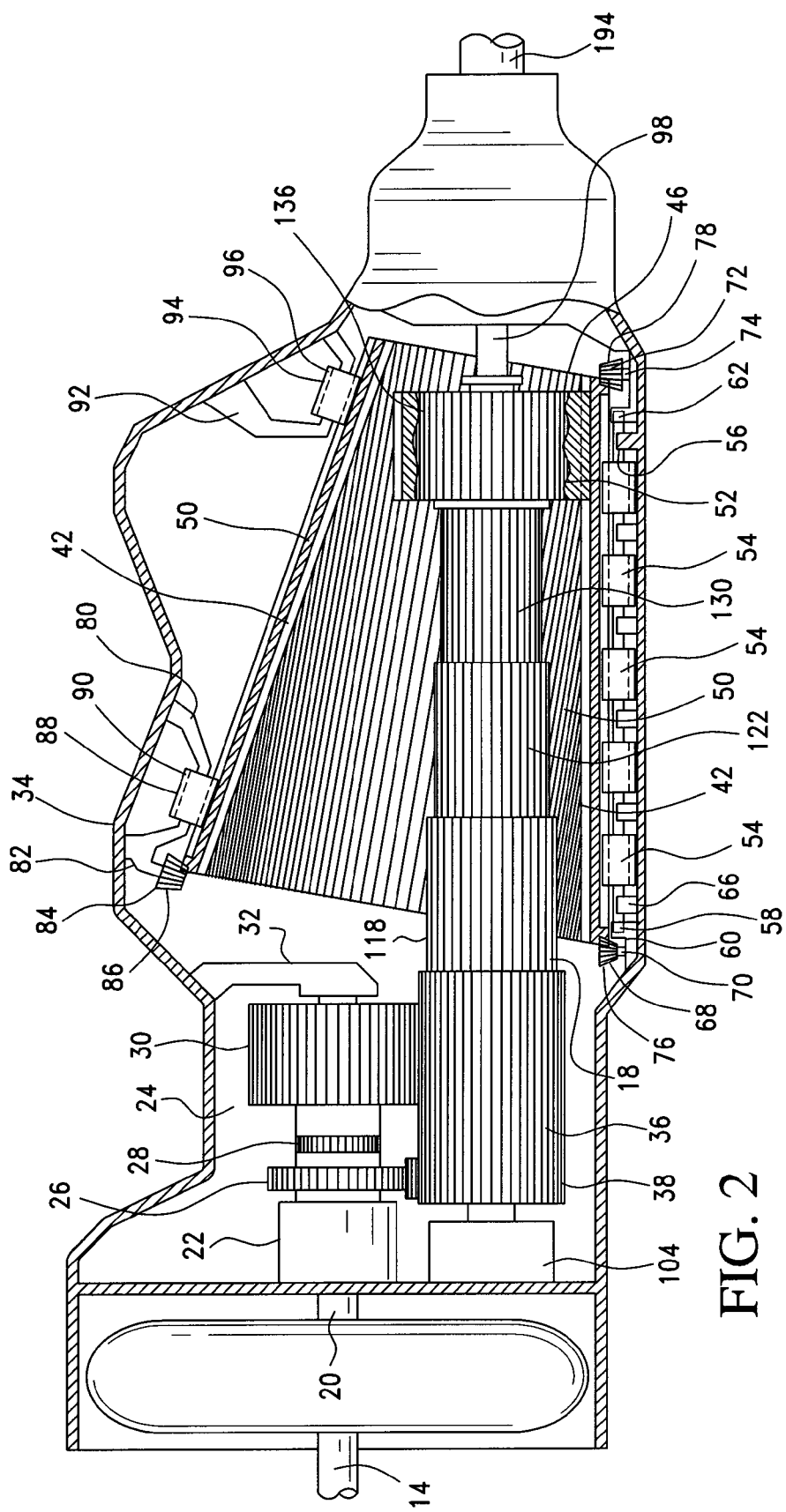
FIG. 2 is a side view of the variable transmission of the first embodiment illustrated in FIG. 1.
Figure 3:
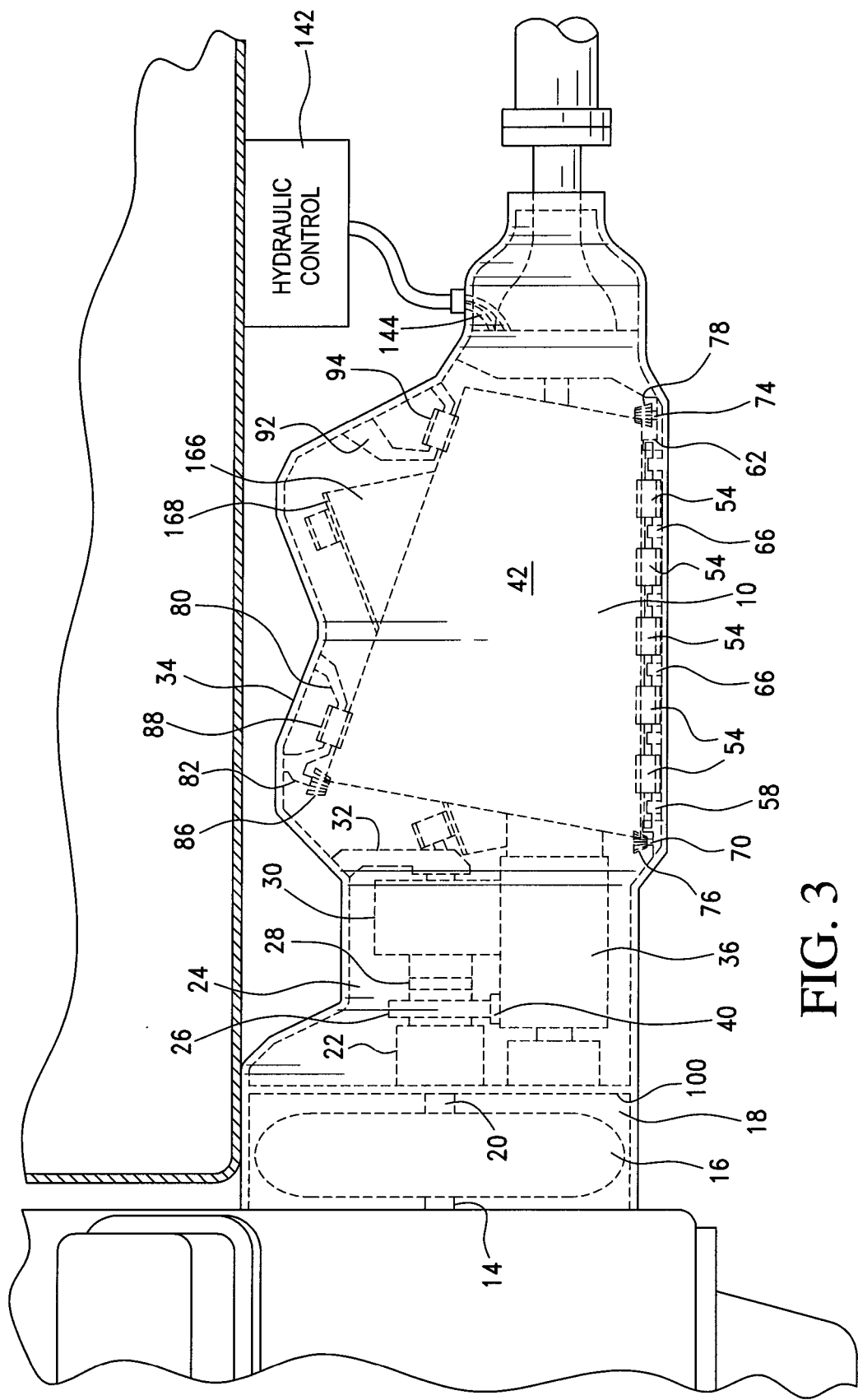
FIG. 3 is a perspective view of the second preferred embodiment of the variable transmission having a pair of frusto-conical gears within a vehicle according to the present invention.

Referring now to FIG. 2, a plurality of stabilizing face gears 54, preferably, but not limited to, four stabilizing face gears 54, are rotatably supported on the bottom of the casing 34 along a common rotating shaft 56. The common rotating shaft 56 includes a first end 58 supported by a first upward flange 60 having a bearing means for rotatably supporting the first end 58, and a second end 62 supported by a second upward flange 64 having another bearing means for supporting the second end 62, and further supported by a plurality of support extensions 66, which also provide a separation means between the stabilizing gears 54 and further provide rotatable support with bearing means to allow the common shaft 56 to rotate. Each stabilizing face gear 54 includes a plurality of teeth 68 on an outer periphery thereof, which plurality of teeth 68 engage the helical teeth 50 of the first frusto-conical gear 42, and are able to freely rotate and provide support for the rotation of the first frusto conical gear 42.

The first end 44 of the first frusto-conical gear 42 is also rotatably supported by a first holding gear 68 disposed on a vertical axis 70 extending upwardly from the first upward flange 60, and the second end 46 of the first frusto-conical gear 42 is similarly rotatably supported by a second holding gear 72 on a vertical axis 74 extending upwardly from the second upward flange 64. Preferably, the first and the second holding gears 68, 72 have a frusto-conical shape and configuration, and a plurality of helical teeth 76, 78, respectively, threadably engaging the helical teeth 50 of the first frusto-conical gear 42.

A second support arm 80 having a substantially U-shaped configuration is attached to an upper inner surface of the variable speed transmission housing 34, and includes an extension arm 82 supporting a third holding gear 84, preferably of the same shape, dimension, and configuration as the first and the second holding gears 68, 72, and having a plurality of helical teeth 86 threadably engaging the helical teeth 50 of the first frusto-conical gear 42.

A second stabilizing face gear 88 is rotatably supported by the U-shaped second support arm 80, and includes a plurality of teeth 90 to engage with the helical teeth 50. Similarly, a third and substantially U-shaped support arm 92 is attached to a front inner surface of the transmission housing 34, and further rotatably supports a third stabilizing face gear 94 having a plurality of teeth 96 engaging the helical teeth 50 of the first frusto-conical gear 42. Therefore, as best seen in FIG. 2, the first frusto-conical gear 42 is rotatably secured within the transmission housing 34 at the first and the second ends, the lower portion, and the upper portion thereof by the plurality of stabilizing face gears 54, the first holding gear 68, the second holding gear 72, the third holding gear 84, the second stabilizing gear 88, and the third stabilizing gear 94, all of which are freely rotatable as the first frusto-conical gear 42 rotates.

A main power shaft 98 having a first end 100 and a second end 102 and extends substantially the length of the transmission casing 34 and through the hollow opening 48 of the first frusto-conical gear 42, wherein the first end 100 is rotatably disposed within a first bracket 104 attached to a wall 106 of the power converter housing 18 and having a first bearing means 108 therein, and wherein the second end 102 is rotatably disposed within a second bracket 110 proximate second end 46 of the first frusto-conical gear 42, and having a second bearing means 112. The main power shaft 98 extends through the center of the first main face gear 36 and is attached thereto, wherein the rotation of the first main face gear 36 rotates the main power shaft 98. However, as will be explained in detail, the first frusto-conical gear 42 second end 46 is freely supported on the main power shaft 98 allowing the first frusto-conical gear 42 to rotate about the main power shaft 98.

The first main gear face 36 includes a plurality of internal teeth 114 on an inner surface thereof and an opening 116 at one side therefore in an axial direction for, as will be explained, receiving and engaging the outer teeth of an adjoining slidable gear. A first sliding gear 118 is provided having a diameter smaller than that of the first main gear 36, wherein the first sliding gear 118 is dimensioned and configured to slidably move and be received within the opening 116 of the first main face gear 36, and includes a plurality of teeth 120 on an outer surface thereof for engaging the inner teeth 114 of the first main gear 36, and a plurality of teeth 122 on an inner surface thereof for engaging an adjoining slidable gear. The first sliding gear 118 is also supported on the main power shaft 98.

Similarly, a second sliding gear 124 of a face type and having a diameter smaller than that of the first sliding gear 118 is disposed on the main power shaft 98 and includes a plurality of teeth 126 on an outer surface thereof and a plurality of teeth 128 on an inner surface thereof, wherein the plurality of outer teeth 126 engage the plurality of inner teeth 122 of the first sliding gear 118 and the plurality of inner teeth 128 engage the outer teeth of an adjoining sliding gear. A third sliding face gear 130 is also provided having a diameter smaller than that of the second sliding gear 128 and includes a plurality of teeth 132 on an outer surface thereof for engaging the plurality of inner teeth 128 of the second sliding gear 124.

A second end 134 of the third sliding gear 130 is attached to a second main gear 136 by, for example, but not limited to, a plurality of rivets or screws 138. The second main face gear 136 includes a plurality of teeth 140 on an outer surface thereof, wherein, as will be explained, engages the second plurality of teeth 52 on the inner surface of the first frusto-conical gear 42. Therefore, broadly, the rotation of first main face gear 36 is translated by many various combinations of step-down or step-up rotational combinations through the first sliding gear 118, the second sliding gear 124, and the third sliding gear 130.

Figure 6:
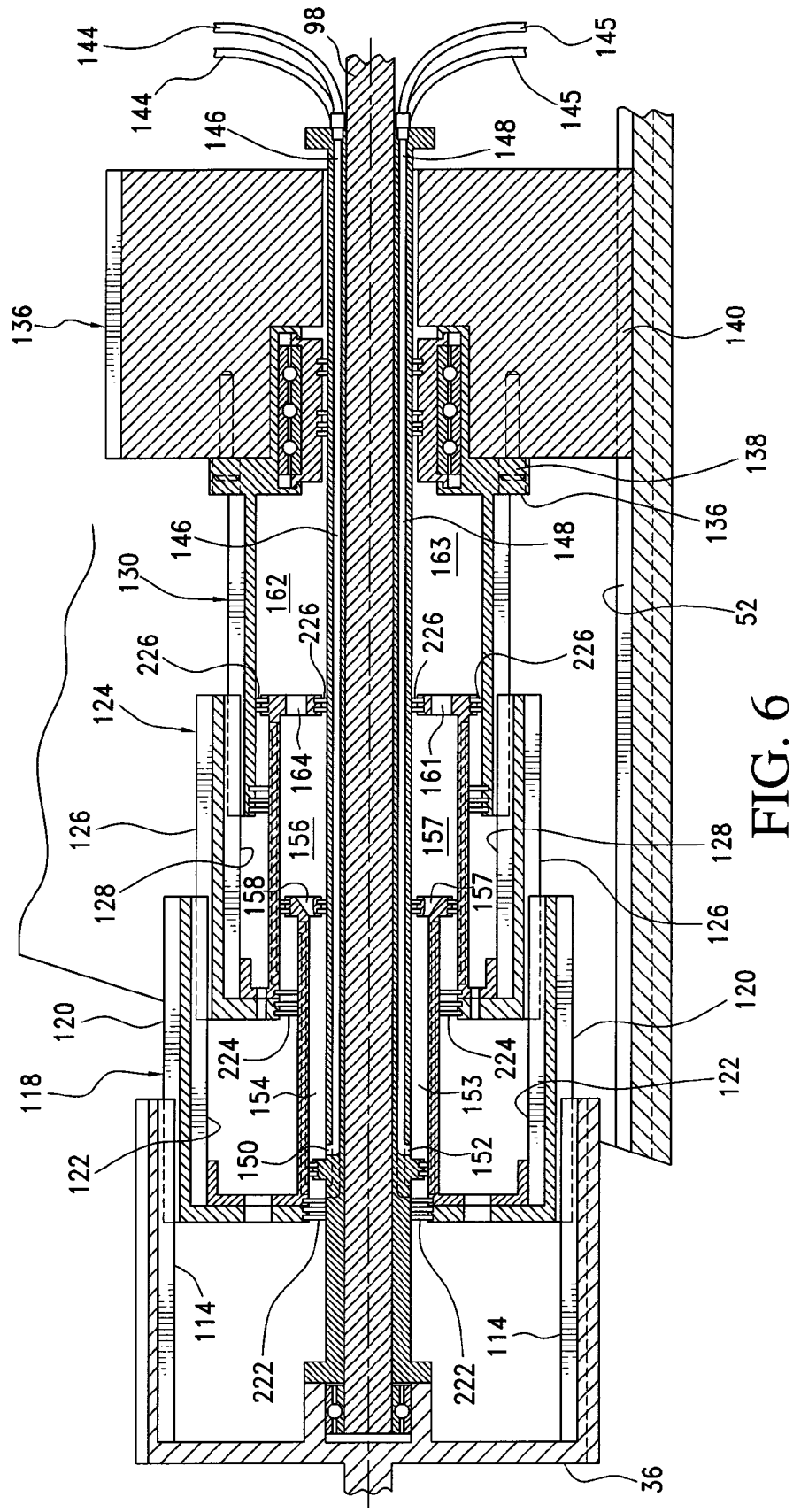
FIG. 6 is a side cross sectional view of the variable speed transmission of FIG. 1 illustrating the sliding gears in an engaging configuration.
Figure 7:
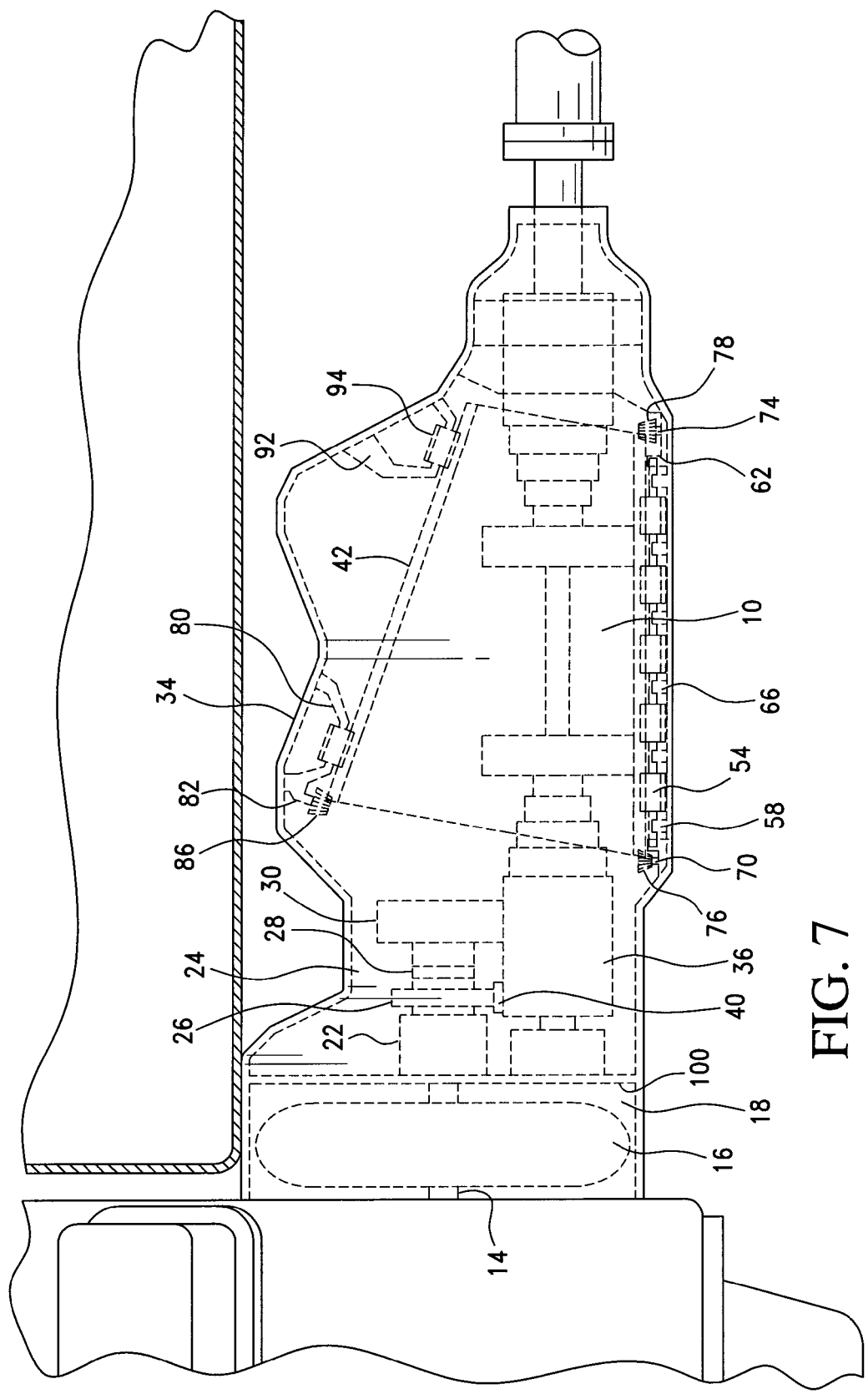
FIG. 7 is a perspective view of the third preferred embodiment of the variable transmission having a second plurality of telescopically sliding gears.
Figure 8:
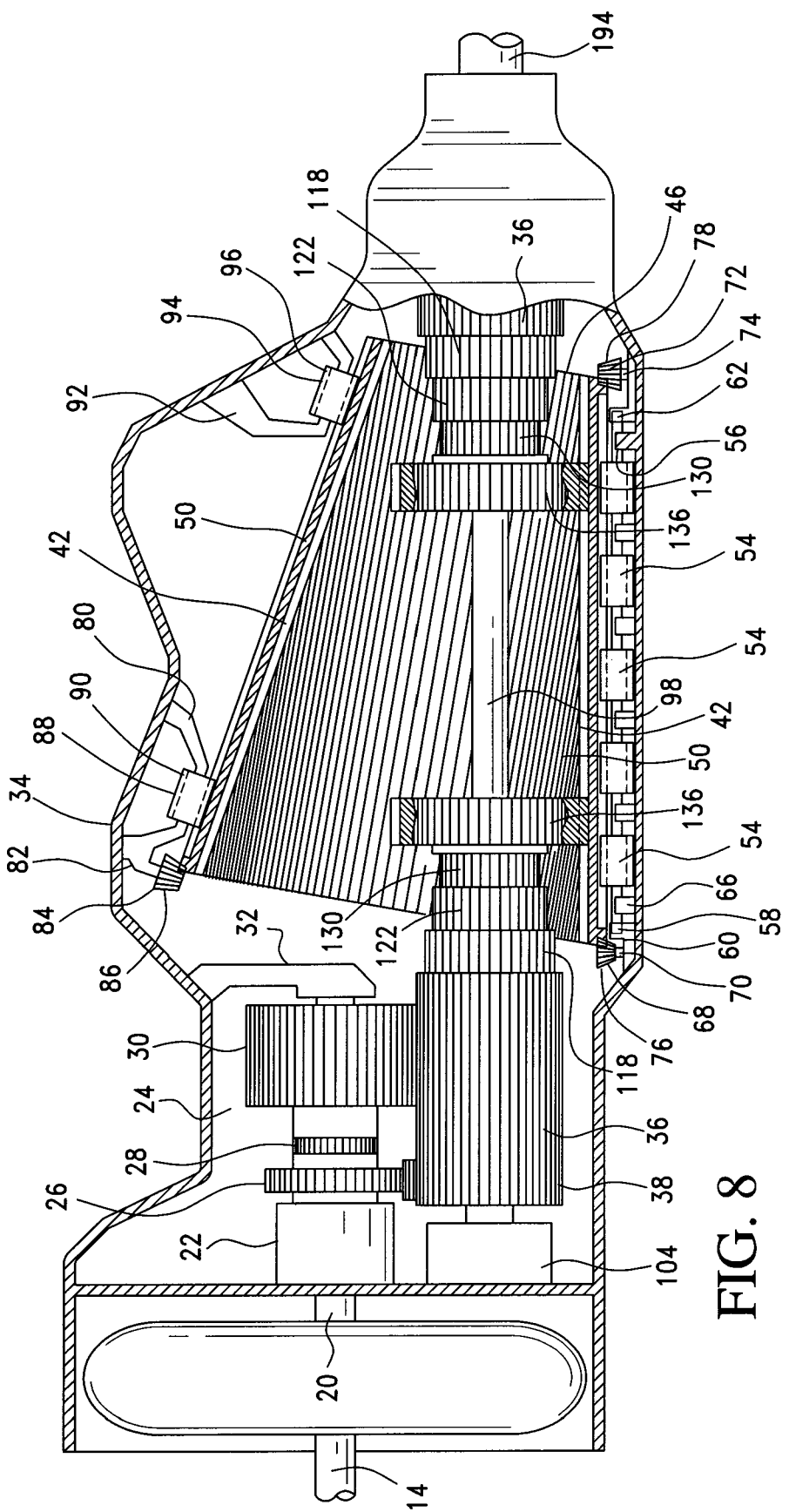
FIG. 8 is a side view of the variable transmission of the third embodiment illustrated in FIG. 7 with the plurality of telescopically sliding gears in a retracted position.
Figure 9:
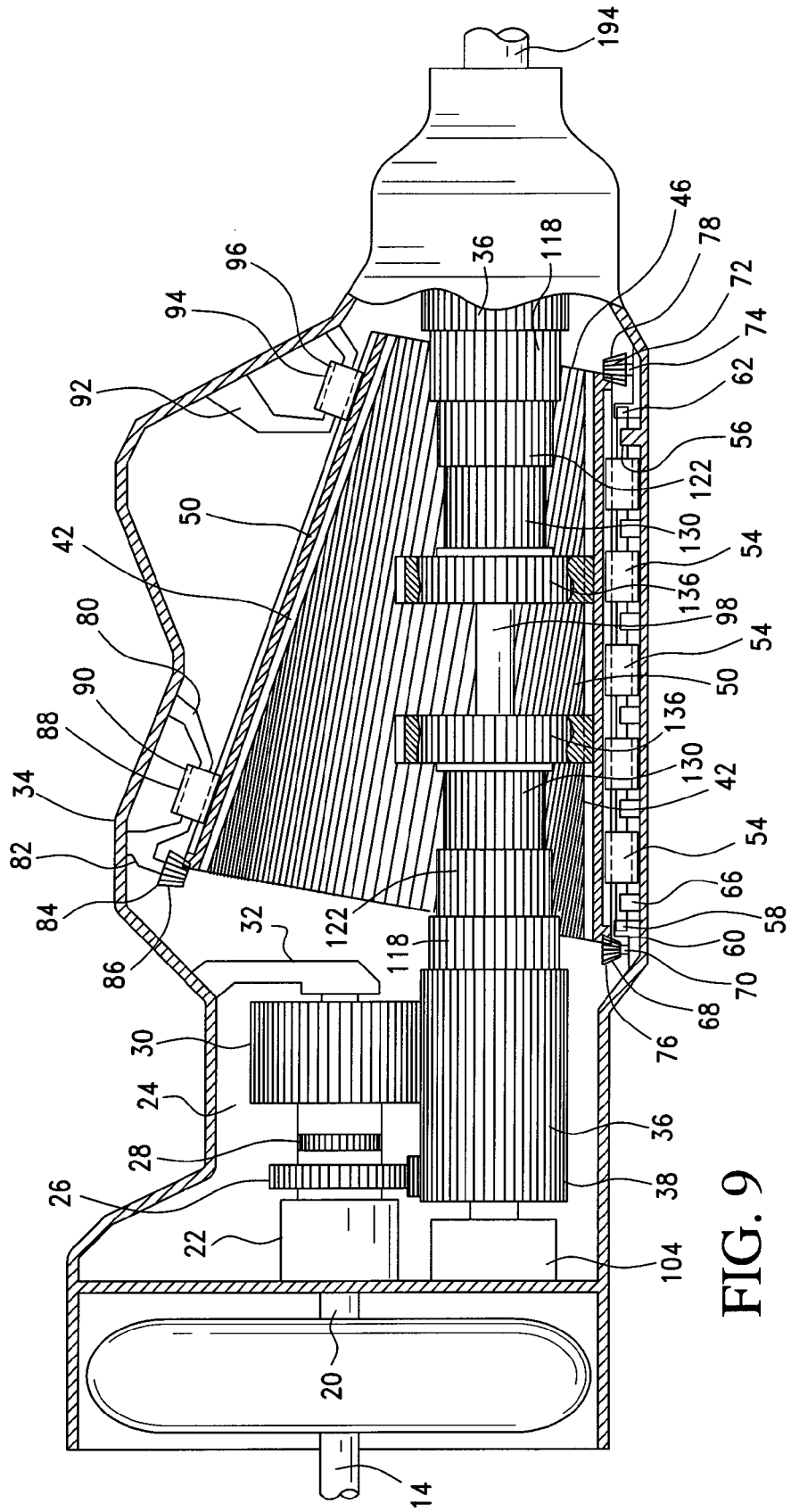
FIG. 9 is a side view of the variable transmission of the third embodiment illustrated in FIG. 7 with the plurality of telescopically sliding gears in an extended position.

Referring now to FIG. 6, the sliding movements of the first, the second, and the third sliding gears will now be explained. The sliding movements are provided by a hydraulic pump and control mechanism 142 using hydraulic pressure and hydraulic fluid, however, other means are also contemplated such as, but not limited to, the use of air pressure. The hollow configuration of each of the first, the second, and third sliding gears provides a housing to be filled with the hydraulic fluid and thereby cause the sliding movement of the sliding gears.

A first plurality of hydraulic tubes 144 provide the hydraulic fluid through a first hydraulic channel 146, which, as will be explained, provide the hydraulic pressure for the expansion of the first, the second, and the third sliding gears, and a second plurality of hydraulic tubes 145 provide hydraulic fluid through a second hydraulic channel 148 extending along the main power shaft 98, which provide the hydraulic pressure for the retraction of the first, the second, and the third sliding gears. The first hydraulic channel 146 has a first outlet 150 at an end opposing the inlet. The first outlet 150 provides an outlet for the hydraulic fluid into a first chamber 154, which is in fluid communication with a second chamber 156 through a first aperture 158, which in turn is in fluid communication with a third fluid chamber 162 through a second aperture 164.

Similarly, the second hydraulic channel 148 includes a second outlet 152 at the opposing end of the inlet of the second hydraulic channel 148 into a fourth chamber 153, which is in fluid communication through an aperture 157 with a fifth chamber 157, and in turn in fluid communication with a sixth chamber 163 through an aperture 161. The second plurality of hydraulic tubes 145 provide the hydraulic fluid within the fourth, the fifth, and the sixth chambers for the retraction of the first, the second, and third sliding gears. Therefore, increasing the hydraulic pressure through the first plurality of the hydraulic tubes and within the first, the second, and third chambers, and simultaneously reducing the hydraulic pressure within the fourth, the fifth, and the sixth chambers allows the first, the second, and third sliding gears to slide to the left of FIG. 6, therefore allowing the second main face gear to engage the larger diameter portion of the first frusto-conical gear and in turn provide a step up gear engagement.

Now, in order to retract the first, the second, and third sliding gears, thereby sliding the second main face gear to the left on FIG. 6 and engaging the smaller inner diameter of the first frusto-conical gear to provide for a step down gear engagement, the hydraulic pressure through the first plurality of hydraulic lines is reduced thereby reducing the hydraulic pressure in the first, the second, and third chambers, and simultaneously, increasing the hydraulic pressure in the fourth, the fifth, and the sixth chambers by increasing the hydraulic pressure through the second plurality of hydraulic lines.

The first, the second, and third sliding gears may also includes a plurality first bearing means 222, a plurality of second bearing means 224, and a plurality of third bearing means 226, wherein the first plurality of bearing means 222 allows the first sliding gear to rotate about the first main shaft, the second plurality of bearing means 224 allows the rotation of the second sliding gear about the outer wall of the first chamber, and the third plurality of bearing means 226 allows the rotation of the third sliding gear about the outer wall of the second fluid chamber.

It is further contemplates the first, the second, and the third sliding gears may be increased in number, or be replaced with other types of telescopically moving mechanisms, wherein it would allow the sliding of the second main face gear to the right or to the left to allow engagement of the inner teeth of the first frusto-conical gear to provide a step up or step down gear engagement.

It is further noted that the amount of hydraulic fluid to be directed into each of the first, the second, and third fluid channels through the apertures may be done manually or automatically through the hydraulic pump and control mechanism 142 based on the desired driving conditions and gear settings.

Figure 4:
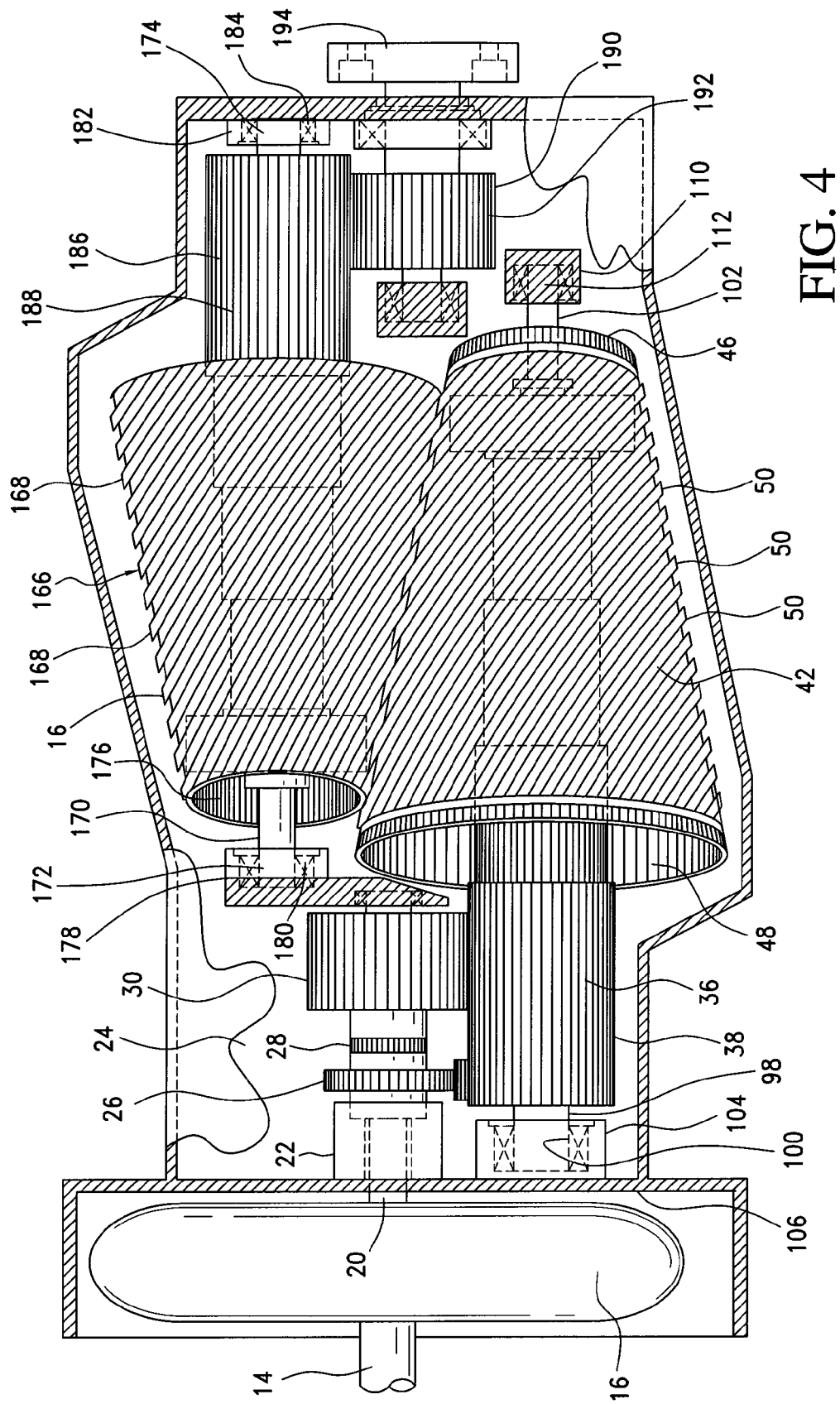
FIG. 4 is a top plan view of the second embodiment of the variable transmission having a pair of frusto-conical gears shown in FIG. 3.
Figure 5:
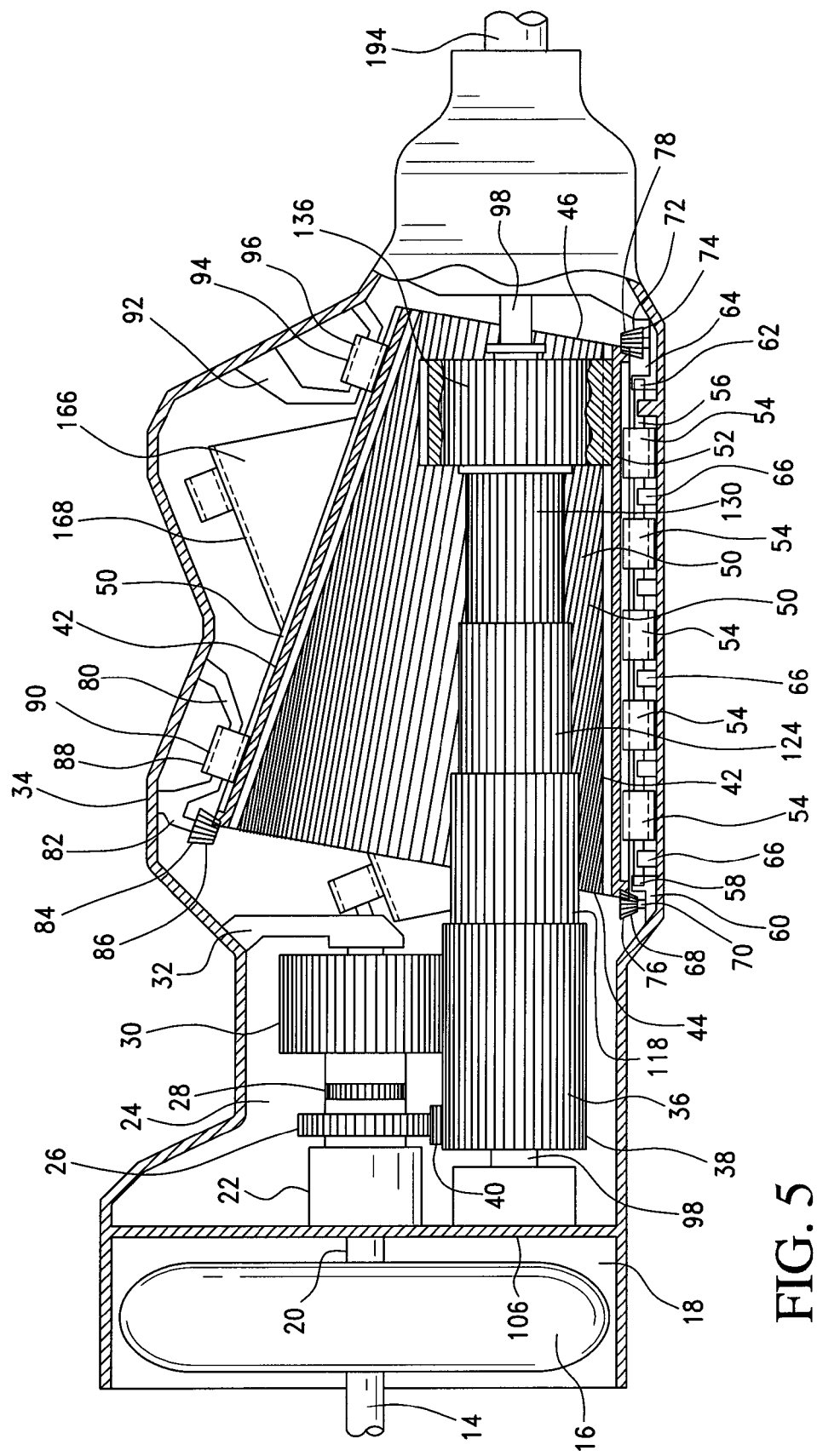
FIG. 5 is a side view of the variable transmission of FIG. 3.

Referring now to FIGS. 4 and 5 of the drawings, the details of a second frusto-conical gear 166 is described within the second embodiment of the invention incorporation a pair of frusto-conical gears is illustrated. It is noted that the present invention is not limited to having one or two frusto-conical gears, rather other embodiment having three, four, or five frusto-conical gears are also contemplated, wherein, increasing the number of frusto-conical gears provides for a smoother gear shifting within the vehicle transmission. It is noted that the details of the second frusto-conical gear 166 and the second set of sliding gears is substantially identical to that of the first frusto-conical gear 42 and the its sliding gears. The second frusto-conical gear 166 includes a plurality of outer helical teeth 168 which are dimensioned and configured to engage the plurality of teeth 50 of the first frusto-conical gear 42.

A second main power shaft 170 having a first end 172 and a second end 174 and extends substantially the length of the transmission casing 34 and through a hollow opening 176 of the second frusto-conical gear 166, wherein the first end 172 is rotatably disposed within a first bracket 178 attached to the support arm 32 and having a first bearing means 180 therein, and wherein the second end 174 is rotatably disposed within a fourth bracket 182 and having a second bearing means 112. The telescopically sliding gear assembly within the second frusto-conical gear 166 is identical to those disposed within the first frusto-conical gear 42, and therefore will not be describe in detail.

The second main power shaft 170 extends through the center of the second frusto-conical gear 166, and at a second end thereof a second main face gear 186 having a plurality of teeth 188 on an outer surface thereof is disposed and may engage a third main face gear 190 having a plurality of teeth 192, which in turn, it ultimately rotates a driving shaft 194. Such combination of the first-frusto conical gear and the second frusto-conical gear, together with the two sliding gear assemblies, is believed to provide an infinite number of step up and step-down transmission gear combinations as opposed to the conventional four-speed or five-speed automatic transmissions.

It is presently believed that the following gear assemblies i.e. design of the gear teeth on the driving gear and the frusto-conical gear contribute to the smooth transition from one speed to another. The design of the teeth will now be discussed with respect to FIGS. 10-14.

As shown in FIG. 10, the outwardly projecting teeth 230 on the driving gear 232 have a cross-sectional shape approximating spaced M(s) with a solid lower portion. The teeth 230 are equally spaced and define a relatively deep opening between adjacent teeth and a shallow opening between alternate deep openings. These openings also include curved portions to accommodate the meshing teeth without binding as will be well understood by persons of ordinary skill in the art of gear design.

The teeth 230 are constructed and arranged to mesh with a plurality of inwardly directing teeth 236 on the frusto-conical gear 234. It should be recognized that the teeth 236 on the frusto-conical gear 234 may be disposed on the inner or outside of the frusto-conical gear and will act in the same way whether inwardly directed on the inner side of the frusto-conical gear 234 or on the outside thereof. As shown, the frusto-conical gear 234 also includes a plurality of relatively short teeth 237 for meshing with the intermediate openings in teeth 230.

FIG. 11 illustrates a driving gear 240 with a plurality of externally directed teeth 230. The externally directed teeth 230 are shown more clearly in the schematic illustration of FIG. 12. As shown therein, the teeth 230 of the driving gear 232 are symmetrical and equally spaced in a conventional manner except that the openings between the deep openings and shallow openings are provided in order to accommodate the teeth 236 and teeth 237 located on the frusto-conical gear 234.

Figure 14:
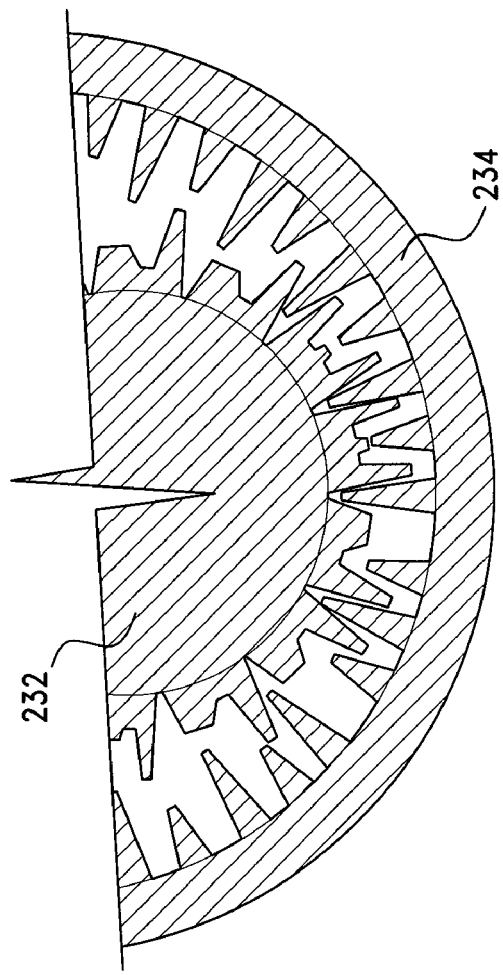
FIG. 14 is a schematic illustration that shows the engagement of the driving gear with teeth in accordance with different embodiments of the invention engaging the gear teeth in a frusto-conical gear.
Figure 13:
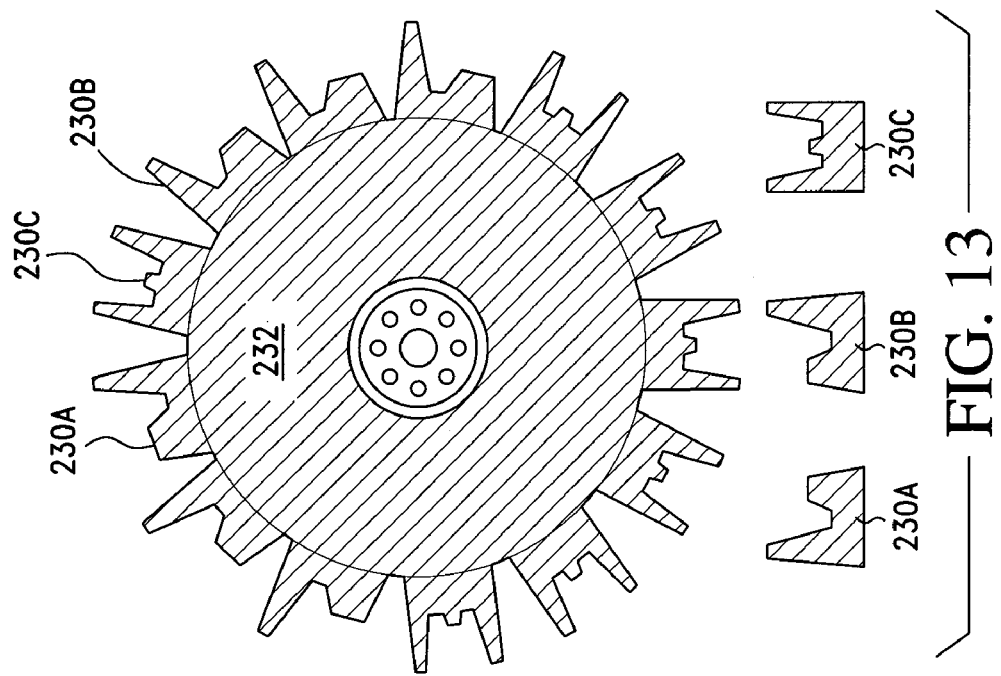
FIG. 13 is a schematic illustration of a drive gear with teeth in accordance with different embodiments of the invention.

The engagement of the drive gear 232 with the frusto-conical gear 234 and various types of teeth on the driving gear 230 are illustrated in FIGS. 13 and 14. For example, the teeth 230A (FIG. 13) have a shape of a chair with a single chair back on the left side while the teeth in 230B are analogous to a single chair back with a chair back on the right side of the seat. Finally, the teeth 230C are referred to a double chair back or M/shaped design. The engagement of the gear 232 and 234 with the teeth 230 A, B and C meshing with the teeth 236 and 237 are illustrated in FIG. 14. However, it should be recognized that a single tooth design i.e. 230A, B or C will be used on the single drive gear.

Figure 15:
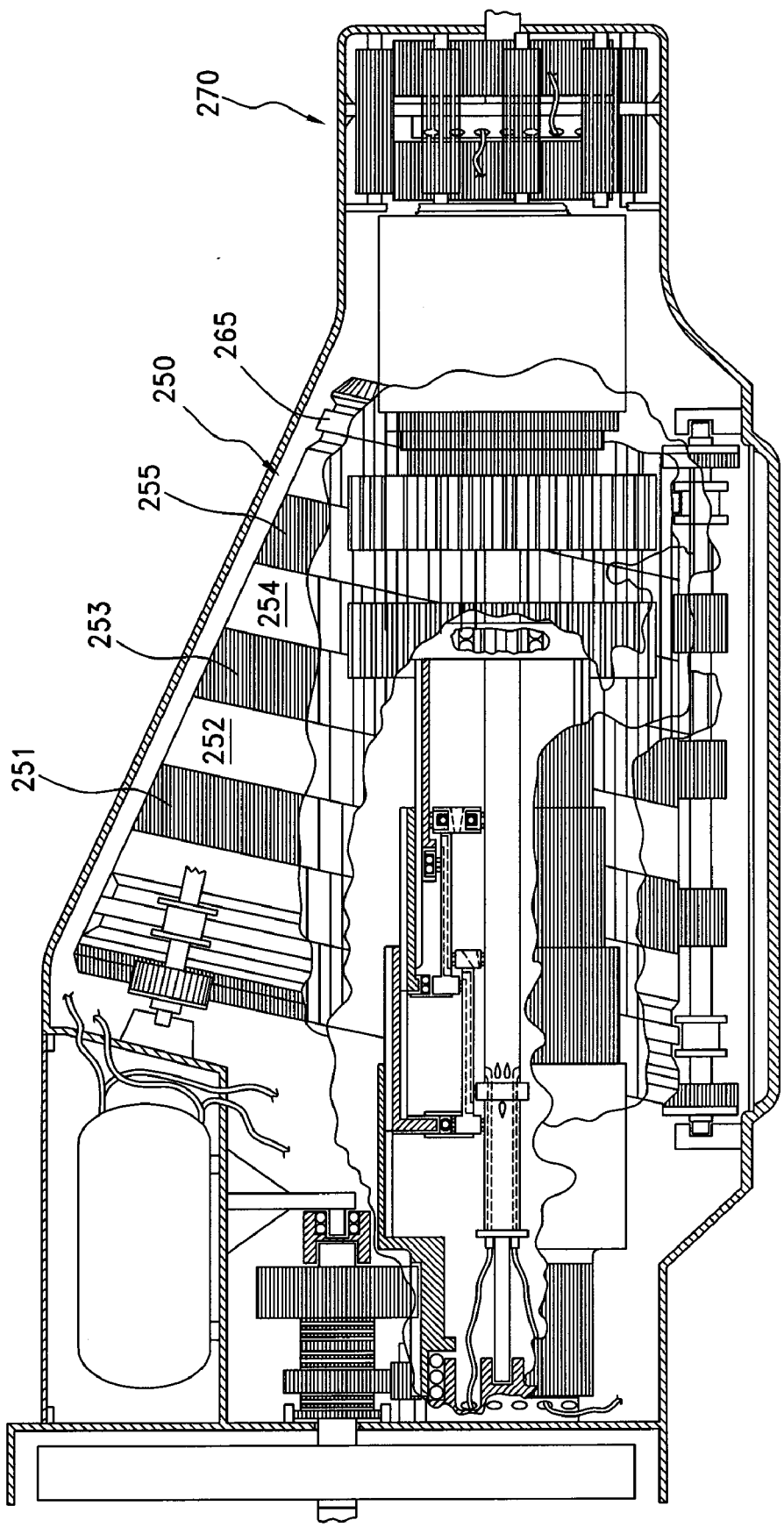
FIG. 15 is a side view of a further embodiment of the invention.

FIG. 15 illustrates a further embodiment of the invention. As shown, a variable transmission includes a frusto-conical member 250 that is made up of a plurality of frusto-conical gear segments 251-255. A support arm (not shown) supports the cone shaped member. The gears 251-255 are joined together to form the conical member 250 and each one is different in that each has a different arrangement of teeth to allow the sliding gears to slide forward and backward while accommodating different diameters.

As illustrated the variable transmission also includes a plurality of pumps 260 for control of the sliding gears as previously described and a support member 262 that makes room for hydraulic hoses. In addition a bearing or ring 265 is also included. In addition an intermediate gear assembly 270 includes a plurality of gears for transferring power from the variable transmission to a drive shaft (not shown) and at the same time allows access to hydraulic fluids for control of the system.

While the invention has been described in connection with its preferred embodiments it should be recognized that changes and modifications may be made therein without departing from the scope of the appended claims.

What is claimed is:

1. A variable automatic transmission for a motor vehicle comprising:
   a housing;
   a frusto-conical driven gear having a length and a plurality of spaced apart teeth on an exterior surface thereof and a hollow opening therein extending the length thereof and rotatably disposed within said housing;
   a first main power shaft having a plurality of sliding face gears slidably supported thereon wherein a first of said plurality of sliding face gears is adapted to engage an input gear from an engine and a second of said plurality of sliding face gears is a driving gear having a plurality of complimentary spaced apart teeth for engaging the plurality of spaced apart teeth of said frusto-conical gear; and
   wherein said plurality of spaced apart teeth on said frusto-conical gear includes a plurality of teeth having a first addendum and a plurality of spaced apart teeth having a larger addendum and wherein said teeth on said driving gear form a plurality of shallow teeth receiving openings for receiving and engaging said spaced apart teeth having a first addendum, and a plurality of relatively deep openings for receiving said spaced apart teeth having a larger addendum and separating said shallow teeth receiving openings.

2. A variable automatic transmission for a motor vehicle according to claim 1 in which said frusto-conical driven gear has a plurality of spaced apart teeth on an internal surface thereof and said driving gear has a plurality of spaced apart teeth on an exterior thereof.

3. A variable automatic transmission for a motor vehicle according to claim 2 further comprising a hydraulic means sliding said plurality of sliding face gears.

4. A variable automatic transmission for a motor vehicle according to claim 2 which includes hydraulic means for sliding said plurality of sliding face gears.

5. A variable automatic transmission for a motor vehicle according to claim 2 which includes a plurality of slidable face gears rotationally disposed on a lower inner surface of said housing and having a plurality of outer teeth and wherein said frusto-conical gear has a plurality of spaced apart outer teeth engaging the outer teeth of said plurality of sliding face gears.

6. A variable automatic transmission for a motor vehicle according to claim 5 which includes hydraulic means for sliding said plurality of sliding face.

7. A variable automatic transmission for a motor vehicle according to claim 6 wherein said hydraulic means includes a first inlet tube and a second inlet tube and each of said plurality of sliding face gears including first and second channels for receiving hydraulic fluids and wherein the first inlet tube provides hydraulic fluid through the first channel to telescopically move the sliding face gear in an extending direction and the second inlet provides hydraulic fluid through the second channel to move the sliding gear in a retracting direction.

8. A variable automatic transmission for a motor vehicle comprising:
   a housing;
   a first frusto-conical gear having a length, a plurality of teeth on an outer surface thereof and a hollow opening therein extending the length therein and rotatably disposed within said housing and said first frusto-conical gear having a plurality of spaced apart teeth on an inner surface thereof;
   a first main power shaft having a plurality of sliding face gears slidably supported thereon wherein a first of said plurality of sliding face gears engages an input gear from an engine and the last of said plurality of sliding face gears is a driving gear that engages the plurality of inner teeth of said frusto-conical gear;
   a second main power shaft and a second frusto-conical gear having a plurality of spaced teeth on an outer surface thereof and a plurality of teeth on an inner surface thereof and rotatably disposed within said housing on said second main power shaft;

a second plurality of sliding face gears slidably supported on said second main power shaft and said second frusto-conical gear's plurality of outer teeth engaging the first frusto-conical gear's plurality of outer teeth; and wherein said plurality of spaced apart teeth on said frusto-conical gear includes a plurality of teeth having a first addendum and a plurality of spaced apart teeth having a larger addendum and wherein said teeth on said driving gear form a plurality of shallow teeth receiving openings for receiving and engaging said spaced apart teeth having a first addendum, and a plurality of relatively deep openings for receiving and engaging said spaced apart teeth having a larger addendum and for supporting said shallow teeth receiving openings.

9. A variable automatic transmission for a motor vehicle according to claim 8 which includes a plurality of stabilizing face gears rotatably disposed on a lower inner surface of said housing and having a plurality of outer teeth wherein said plurality of said outer teeth engage the outer teeth of said first frusto-conical gear.

* * * * *